Feb. 9, 1932.　　　　W. SRAMEK　　　　1,844,448
AIRPLANE
Filed Aug. 22, 1930　　　3 Sheets-Sheet 1
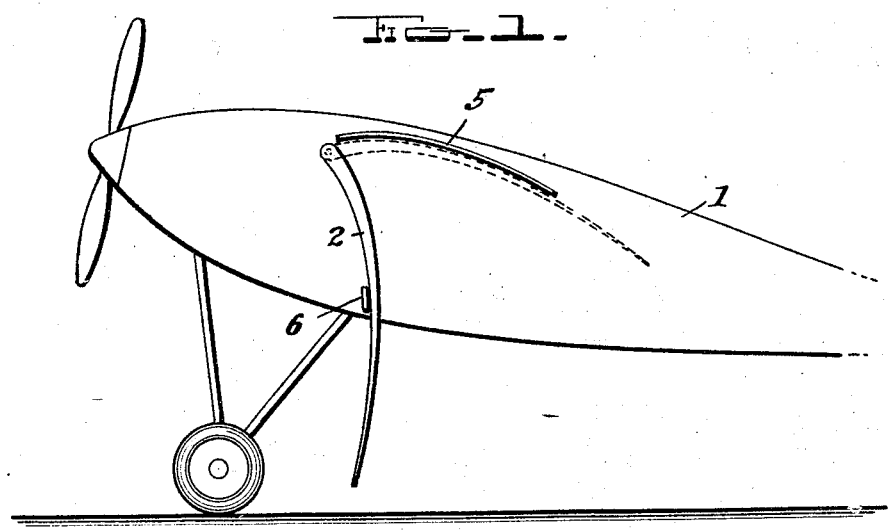
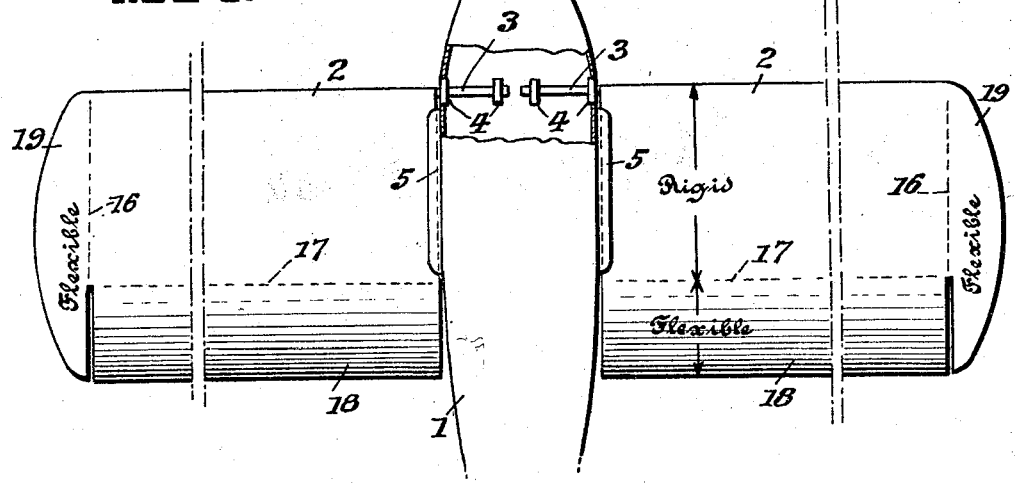
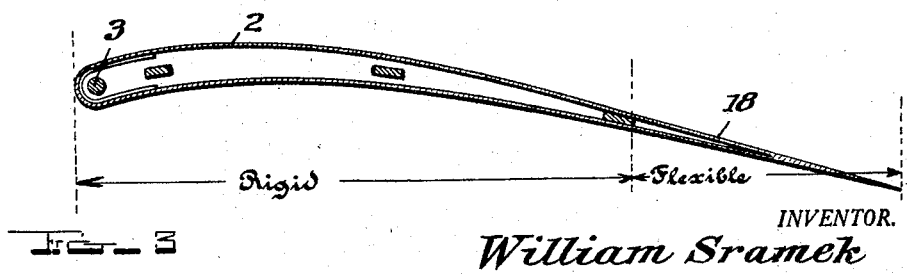
INVENTOR.
*William Sramek*
BY
*Jacobi & Jacobi* ATTORNEYS.

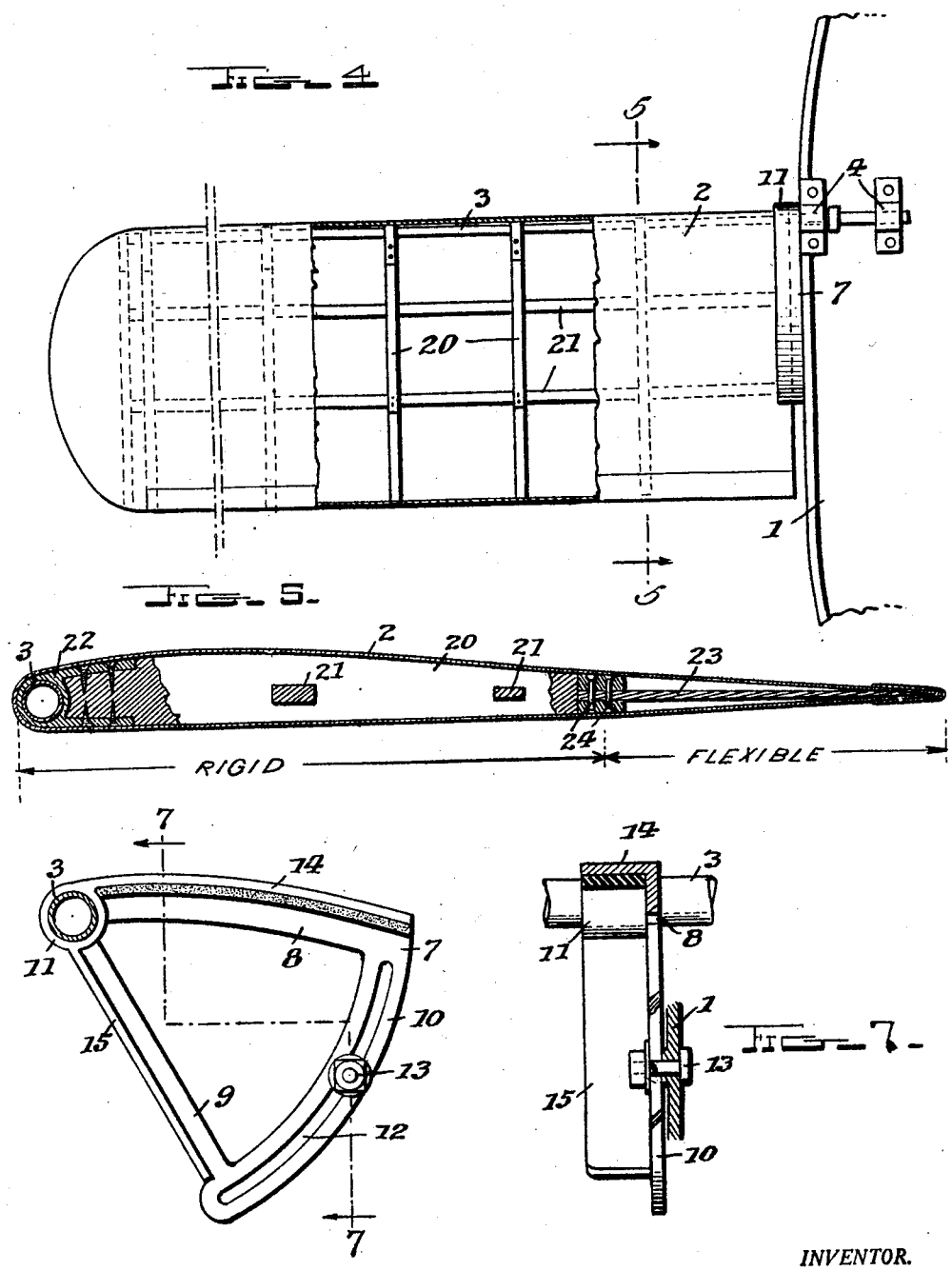

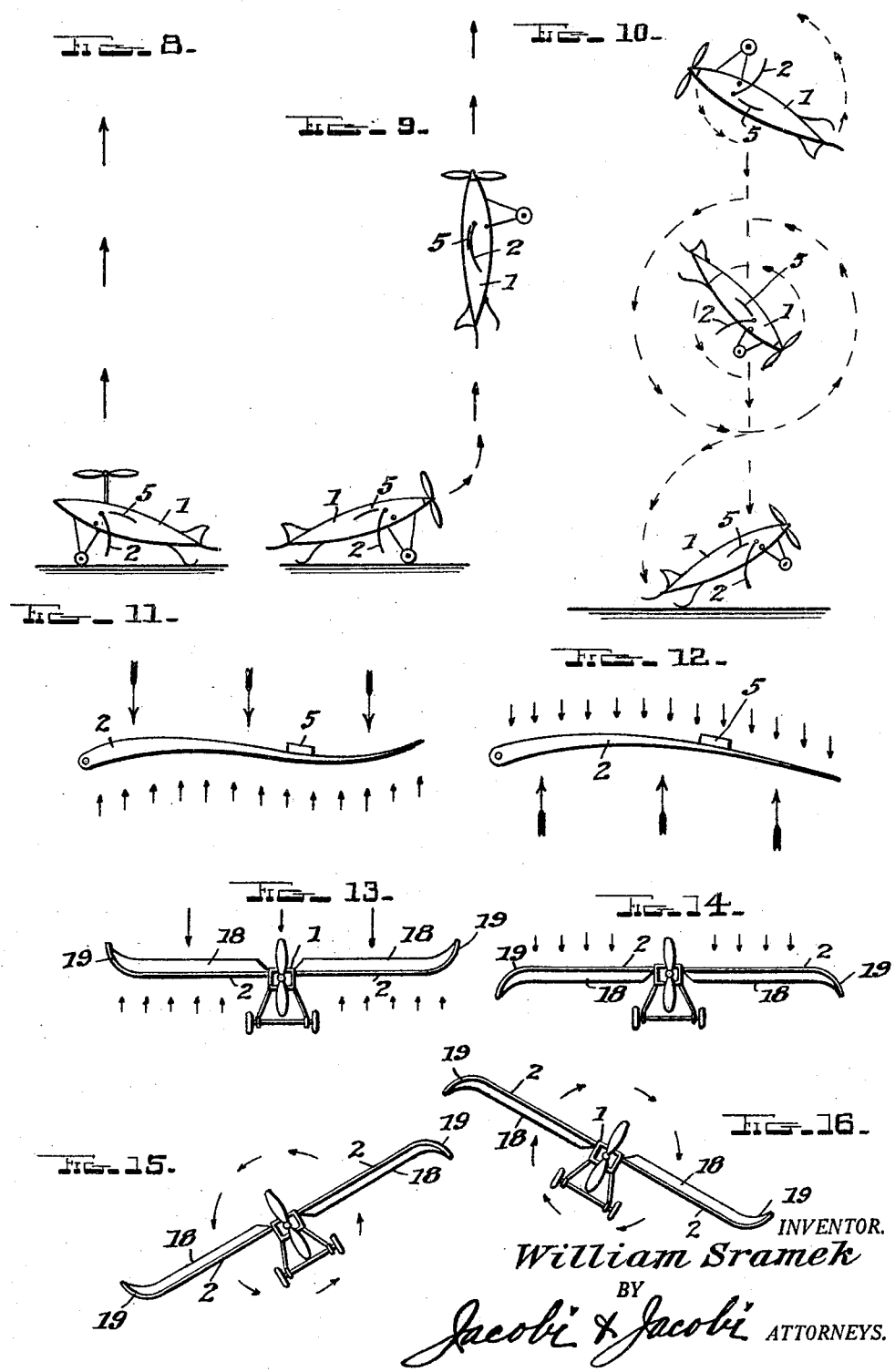

Patented Feb. 9, 1932

1,844,448

UNITED STATES PATENT OFFICE

WILLIAM SRAMEK, OF NEW YORK, N. Y.

AIRPLANE

Application filed August 22, 1930. Serial No. 477,133.

This invention relates to airplanes and more particularly to an airplane having wings constructed and mounted in an improved manner.

One object of the invention is to so construct and mount the wings that they may have movements imparted to them by air currents when an airplane is in motion similar to movements of a bird's wings and prevent danger of wrecks due to side slipping or by an airplane going into a nose dive or tail spin.

Another object of the invention is to provide the airplane with wings having portions which are flexible and have movements imparted to them by air currents and pressures when the airplane is in flight, thereby taking the place of ailerons but being flexed automatically by the air currents and pressures and requiring no attention on the part of the aviator. Therefore, the aviator only has to operate controls for the rudder and elevators and there will be no danger of a side slip due to improper banking during a turn or failing to keep the airplane level when flying straight away.

Another object of the invention is to permit the wings to have swinging movement about an axis along their entering edges and be swung from a depending substantially vertical position to a raised weight sustaining position by air currents when the airplane is in motion thereby permitting the airplane to rise at a very steep angle and also permit the wings to automatically adjust themselves and assume the best angle of incidence according to the set of the rudder and the speed at which the airplane is moving.

Another object of the invention is to provide the airplane with wings pivotally mounted to swing freely about an axis extending through their entering edges thereby permitting the airplane to descend with a tumbling motion in a substantially vertical path without going into a nose dive or tail spin and make a safe landing without being guided to earth by the pilot. Therefore, the airplane may be landed in a small field and may safely come to earth without liability of being wrecked if the aviator should be taken sick or otherwise rendered unable to direct movements of the airplane.

The invention is illustrated in the accompanying drawings wherein:

Figure 1 is a side elevation of an airplane equipped with the improved wings.

Figure 2 is a top plan view of the airplane.

Figure 3 is a sectional view through one wing.

Figure 4 is a view partially in top plan and partially in section showing the manner of constructing and mounting the wings.

Figure 5 is a sectional view taken along the line 5—5 of Figure 4.

Figure 6 is a side elevation of the bracket showing Figure 4 for limiting swinging movement of the wing.

Figure 7 is a section along the line 7—7 of Figure 6, and

Figures 8 through 16 are diagrammatic views illustrating actions which take place when an airplane having the improved wings is in flight.

This improved airplane has a fuselage 1 of a conventional construction and it will be understood that it will be equipped with the usual vertical and horizontal rudders which are to be actuated in a conventional manner by the pilot. Wings 2 extend from opposite sides of the fuselage and are mounted at such a height that they may hang in the lowered position shown in Figure 1 without dragging upon the ground. These wings are mounted for indefinite free swinging movement about an axis extending through their entering edges and it is to be understood that the shaft or pivot bar 3 of each wing which extends longitudinally through its entering edge and projects from its inner end as shown in Figures 2 and 4 may be firmly secured in the mounting 4 or rotatably engaged therein. If the shaft is fixed in its mountings the wing is loose so it may swing about the shaft whereas if the shaft turns in the mountings the wing will be fixed to the shaft. In either case the wings are free to swing from the lowered position shown in full lines in Figure 1 to the raised position indicated by dotted lines in this figure.

It is necessary to limit swinging movements of the wings and in order to do so the fuselage may carry at its sides upper and lower fixed abutments 5 and 6 but in the preferred construction a bracket 7 is mounted at each side of the fuselage. One of these brackets is illustrated in Figure 5 and referring to this figure it will be seen that the bracket is substantially triangular in shape and has upper and lower arms 8 and 9 connected by an arcuate bar 10 and having their forward ends intersecting and formed with a bearing 11 loosely engaged about the shaft 3 of the wing. A slot 12 is formed longitudinally in the bar 10 to receive a bolt 13 carried by the fuselage and it will be readily seen that by loosening the bolt the bracket can be swung vertically about the shaft 3 and the bolt then again tightened to secure the bracket in a set position. By this arrangement positions occupied by the flanges or upper and lower abutments 14 and 15 projecting from the bars 8 and 9 can be controlled and the arc in which the wings move regulated. Therefore, the angle of incidence of the wings may be regulated according to the type of airplane. It will thus be seen that the wings are mounted for vertical swinging movement and are not controlled by the pilot.

The wings in addition to being mounted in a special manner are of a special construction and each is of a rigid construction from its inner end to the dotted line 16 in Figure 2 and from its entering edge to the dotted line 17. Therefore, each wing is rigid for the major portion of its width and for approximately two-thirds its cord and has a flexible rear portion and tip. In this respect the wing resembles a bird's wing since it is rigid for the major portion of its area and has flexible rear portion and tip corresponding to the feathers. This is clearly shown in Figures 2 and 3 where the flexible portions are designated by the numerals 18 and 19.

Referring to Figures 4 and 5 it will be seen that each wing has ribs 20 connected by wing spars 21 which extend longitudinally of the wing but terminate in spaced relation to the outer end or tip of the wing. A shoe or mounting 22 is provided at the front end of each rib to engage about the bar 3. The rear portion 23 of the rib may be formed of resilient metal or pliable wood in order to permit the trailing portion 18 of the wing to be flexed vertically and by referring to Figure 5 it will be seen that the front end of the rib sections 23 is fitted into the rear end of the main rib section where it is secured by rivets or other suitable fasteners 24. I have, therefore, provided the airplane with wings which are permitted to swing freely about the shafts 3 until stopped by engagement with the flanges 14 or 15 of the brackets 7 and have so constructed the wings that their tips and trailing edge portions may be flexed by air pressures when the airplane is in motion.

Operation of the improved airplane is as follows:

When the plane is at rest the wings hang downwardly as shown in Figure 1 and when the motor is started the wings act as a brake. As the power is increased and flying speed is reached, the feathered wings will slowly swing up until the rigid parts of wings come up against the top stops 5. As the pressure increases under the wings, the flexible trailing edges will curve up (as in Figure 13) acting as a horizontal rudder set for a rise. The front end of the plane will now start to rise off the ground with the plane resting on its tail skid. As soon as the plane reaches a vertical position, the feathered wings and the streamlining of the fuselage will reduce the resistance and the plane will rise vertically very rapidly. If the plane is rising in a vertical position (as in Fig. 9) and the engine stalls or slows down below flying speed, the plane will not nose dive or tail spin to the ground with a crash. The plane will start to tumble down slowly as shown in Figure 10, keeping the same rate of speed it started with until it lands on its tail skid and then drops to its wheels. The action of the plane coming down is the same as a tumbler pigeon.

When the plane is flying a horizontal course with the rigid portions of the wings against the top stops 5 and a down draft strikes it, the pressure on the top of the wings, indicated by the large arrows in Figures 11 and 13, will force the wings down instead of the plane thereby sharpening the climbing angle and also creating a greater pressure (small arrows) under them which curves the flexible trailing edges 18 of the wings up so that they act as automatic horizontal rudders which head the plane up. The flexible tips 19 of wings are also curved up and act as automatic vertical rudders to keep the plane from yawing.

The flexible ends 18 of the wings act as automatic ailerons in the following manner. When the plane is flying a horizontal course, the wings are in a normal angle of incidence. If the plane starts to fall, or a down draft strikes it, the greater pressure created under wings will force the rigid portions of the wings against the upper stops 5 and as they cannot move any further in this direction, the flexible portions of the wings will curve upwardly as shown in Figure 13 and cause the plane to automatically rise. If an up draft strikes the plane, the wings being in engagement with upper stops cannot move further, and as the plane is forced up, the pressure created over it will curve the flexible portions of the wings downwardly as shown in Figure 14 thereby causing the plane to head down. This movement of the automatic ailerons thereby causes them to automatically act as a horizontal rudder. When curved up they tilt the plane upwardly and when curved down they tilt the plane downwardly.

When making a turn, right or left, the wings automatically assume a wash-in and a wash-out position. As the rudder is set for a left turn shown in Figure 16, the right wing will start to cant upwardly. The greater pressure created by this action above it, will move this wing toward the bottom stop 6 thereby feathering it, and as its rigid part engages the stop, the flexible part 18 of the wing will curve downwardly. This position of the right wing is creating a left or wash-in. At the same time the left wing is dipping, creating by this action a greater pressure under it which moves this wing towards the upper stop 5. As it cannot move any further, the flexible portion 18 of the wing will curve upwards. The left wing in this position is creating a dip, or wash-out. If no other action took place, the plane would roll completely over but the flexible ends 19 of the wings now come into action. The right wing that is being lifted has its tip 19 turned down, thereby causing a downward action on that wing, and the left wing that is being dipped at the same time has its tip 19 curved upwardly which causes a lifting action on that wing. As the pressure above and below the wings balance, this steadies the plane and it will make a smooth turn, and will be prevented from turning over or side slipping, even if the plane is given too much rudder. If no rudder was used and the plane was left to itself, in this position, it would spin around in a horizontal direction, left or right, according to which of the wings had a wash-in or a wash-out.

Rolling when flying straight away is prevented automatically in the following manner. When the plane rolls to the right, the right wing is moved to the top stop and its flexible tip 19 is curved upwards by the greater pressure created under this wing. This action creates a lift on the right wing. The left wing is moved to the bottom stop and its flexible tip curved downwardly by the greater pressure on the upper side of the wing. This creates a downward action on the left wing which steadies the plane and prevents it from rolling. If the plane rolls towards the left, the actions, of course, will be reversed.

The plane may be landed in the usual manner but if the pilot should become ill there will be no danger of a wreck as the motor can be shut off and the plane will land itself and will always alight in an upright position.

In Figure 8 there has been shown a plane equipped with an overhead propeller. This plane functions as a glider and is to be raised to the direct altitude by its propeller. When the desired altitude is reached, the wings which have hung downwardly in a feathered position during the upward movement will swing upwardly against the stops 5 and the engine can then be shut off and the plane operated as a glider.

While I have shown the preferred embodiment of my invention it is to be understood that minor changes in the size, shape and arrangement of parts may be resorted to without departing from the spirit of the invention or the scope of the appended claims.

Having thus described the invention what I claim is:

1. In an airplane, a fuselage, and wings extending from opposite sides thereof, said wings being pivotally mounted to swing freely about an axis along their entering edges from a lowered to a raised position and means to limit swinging movements of the wings consisting of brackets carried by the fuselage and vertically adjustable thereon and having upper and lower abutments engageable by the wings.

2. In an airplane, a fuselage, and wings extending from opposite sides thereof, said wings being pivotally mounted to swing freely about an axis along their entering edges from a lowered to a raised position and means to limit swinging movements of the wings consisting of brackets pivotally mounted and extending longitudinally of the fuselage and provided with upper and lower abutments for engagement by the wings, and means to releasably secure the brackets in set positions.

3. In an airplane, a fuselage, wings extending from opposite sides of said fuselage, said wings being pivotally mounted to swing freely out of control of the pilot about an axis along their entering edges to vary the angle of incidence, and brackets mounted for pivotal adjustment in a vertical plane about the axis of the wing at opposite sides of the fuselage and having upper and lower abutments projecting transversely from the fuselage for engagement by the wings to limit swinging movement of the wings.

In testimony whereof I affix my signature.

WILLIAM SRAMEK.